(12) United States Patent
Baker et al.

(10) Patent No.: US 12,165,382 B2
(45) Date of Patent: Dec. 10, 2024

(54) BEHAVIOR-BASED COMPUTER VISION MODEL FOR CONTENT SELECTION

(71) Applicant: DISNEY ENTERPRISES, INC., Burbank, CA (US)

(72) Inventors: Aaron Michael Baker, Raleigh, NC (US); Mary Nell Borst, Studio City, CA (US); Dennis Li, Los Angeles, CA (US); Jacek Krzysztof Naruniec, Windlach (CH); Dustin Clint Tucker, Mocksville, NC (US); Romann Matthew Weber, Uster (CH)

(73) Assignee: Disney Enterprises, Inc., Burbank, CA (US)

( * ) Notice: Subject to any disclaimer, the term of this patent is extended or adjusted under 35 U.S.C. 154(b) by 122 days.

(21) Appl. No.: 17/694,537

(22) Filed: Mar. 14, 2022

(65) Prior Publication Data

US 2023/0290109 A1 Sep. 14, 2023

(51) Int. Cl.
*G06V 40/16* (2022.01)
*G06V 10/62* (2022.01)
*G06V 10/776* (2022.01)

(52) U.S. Cl.
CPC .......... *G06V 10/62* (2022.01); *G06V 10/776* (2022.01); *G06V 40/176* (2022.01)

(58) Field of Classification Search
CPC .... G06V 10/62; G06V 10/776; G06V 40/176; G06V 40/16; G06V 40/174; G06V 40/175
See application file for complete search history.

(56) References Cited

U.S. PATENT DOCUMENTS

| 7,636,456 | B2 * | 12/2009 | Collins | G09F 27/00 725/12 |
| 8,401,248 | B1 * | 3/2013 | Moon | G06V 40/18 382/103 |
| 9,361,705 | B2 | 6/2016 | Lucey et al. | |
| 9,443,144 | B2 | 9/2016 | Lucey et al. | |

(Continued)

FOREIGN PATENT DOCUMENTS

| CN | 113255557 A | * | 8/2021 | |
| EP | 3229178 A1 | * | 10/2017 | G06K 9/00302 |
| WO | WO-2012139243 A1 | * | 10/2012 | G06K 9/00228 |

OTHER PUBLICATIONS

Bernin, Arne, et al. "Automatic classification and shift detection of facial expressions in event-aware smart environments." In Proceedings of the 11th PErvasive Technologies Related to Assistive Environments Conference, pp. 194-201. 2018. (Year: 2018).*

(Continued)

*Primary Examiner* — Carol Wang
(74) *Attorney, Agent, or Firm* — Squire Patton Boggs LLP; Sarah Mirza

(57) ABSTRACT

Various embodiments set forth systems and techniques for evaluating media content items. The techniques include receiving visual feedback associated with one or more audience members viewing a first media content item; analyzing the visual feedback to generate one or more emotion signals based on the visual feedback; and generating a set of features associated with the one or more audience members viewing the first media content item based on the one or more emotion signals.

20 Claims, 6 Drawing Sheets

(56) References Cited

U.S. PATENT DOCUMENTS

| | | | | |
|---|---|---|---|---|
| 2003/0108241 | A1* | 6/2003 | Colmenarez | G06F 16/58 |
| | | | | 382/181 |
| 2009/0285456 | A1* | 11/2009 | Moon | G06V 40/176 |
| | | | | 382/118 |
| 2016/0142767 | A1* | 5/2016 | Shigeta | H04N 21/4788 |
| | | | | 725/12 |
| 2019/0026631 | A1 | 1/2019 | Carr et al. | |
| 2020/0188629 | A1* | 6/2020 | Levenberg | A61N 1/3603 |
| 2022/0019853 | A1* | 1/2022 | Hamedi | G06F 18/214 |
| 2022/0383659 | A1* | 12/2022 | Taylor | A61B 5/0077 |
| 2023/0199250 | A1 | 6/2023 | Weber et al. | |

OTHER PUBLICATIONS

Shreve, Matthew, Jesse Brizzi, Sergiy Fefilatyev, Timur Luguev, Dmitry Goldgof, and Sudeep Sarkar. "Automatic expression spotting in videos." Image and Vision Computing 32, No. 8 (2014): 476-486. (Year: 2014).*

Meftah, I. T., et al. "Emotion recognition using KNN classification for user modeling and sharing of affect states." In Neural Information Processing: 19th International Conference, ICONIP 2012, Doha, Qatar, Nov. 12-15, 2012, Proceedings, Part I 19, pp. 234-242. Springer Berlin Heidelberg, 2012. (Year: 2012).*

Li, Pan, Zhaojun Zhou, Qingjie Liu, Xiaoye Sun, Fuming Chen, and Wei Xue. "Machine Learning-Based Emotional Recognition in Surveillance Video Images in the Context of Smart City Safety." Traitement du Signal 38, No. 2 (2021). (Year: 2021).*

Hussein, Mohamed, and Tamer Elsayed. "Studying Facial Expressions as an Implicit Feedback in Information Retrieval Systems." (2008). (Year: 2008).*

Brooks Barnes, "Lab Watches Web Surfers to See Which Ads Work" The New York Times, https://www.nytimes.com/2009/07/27/technology/27.disney.html, Jul. 26, 2009, 4 pages.

* cited by examiner

BEHAVIOR-BASED COMPUTER VISION MODEL FOR CONTENT SELECTION

BACKGROUND

Field of the Various Embodiments

Embodiments of the present disclosure relate generally to computer science and video analysis and, more specifically, to a behavior-based computer vision model for content selection.

Description of the Related Art

Media providers, such as television stations, television networks, and streaming services, typically select shows, movies, and other content that will be offered by the media provider through a multi-phase process that involves significant amounts of research and surveys, such as focus groups, dial testing, surveys, and the like. A final decision is made at an executive level after considering the reports resulting from this multi-phase process.

One approach for evaluating media content is to use machine learning models to generate predictions of audience reception of the media content. The machine learning models receive media content as input and generate output that indicates a predicted audience appeal of the media content. However, machine learning models typically only evaluate features and characteristics of the media content to generate a prediction. The machine learning models do not account for other factors that relate to audience appeal, such as audience responses to the media content and audience preference. Accordingly, the predictions generated by the machine learning models are not effective or accurate reflections of audience appeal. Therefore, such predictions cannot be relied upon for making business decisions.

The machine learning models could be augmented to incorporate additional features other than the features and characteristics of the media content itself. However, many different factors are involved when considering the appeal of media content to an audience and, therefore, a large number of features are available for augmenting a machine learning model. Consequently, the amount of processing resources needed to account for the additional features would be prohibitively large. In addition, if a model accounts for too many features, then the accuracy of the model would decrease. As a result, augmenting existing machine learning models to account for additional features would not produce more accurate predictions.

As the foregoing illustrates, what is needed in the art are more effective techniques for evaluating the audience appeal of media content.

SUMMARY

One embodiment of the present disclosure sets forth a computer-implemented method for evaluating content items. The method includes receiving visual feedback associated with one or more audience members viewing a first media content item. The method further includes analyzing the visual feedback to generate one or more emotion signals based on the visual feedback. In addition, the method includes generating a set of features associated with the one or more audience members viewing the first media content item based on the one or more emotion signals.

At least one technical advantage of the disclosed techniques relative to the prior art is that, using the disclosed techniques, more accurate predictions of the audience appeal of media content are generated. In particular, by using a machine learning model to evaluate audience reactions to the media content, more reliable audience response measurements are produced compared to approaches that evaluate the media content itself. Accordingly, the predictions generated using the model-generated audience responses are more accurate compared to predictions generated using machine learning models that evaluate media content. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
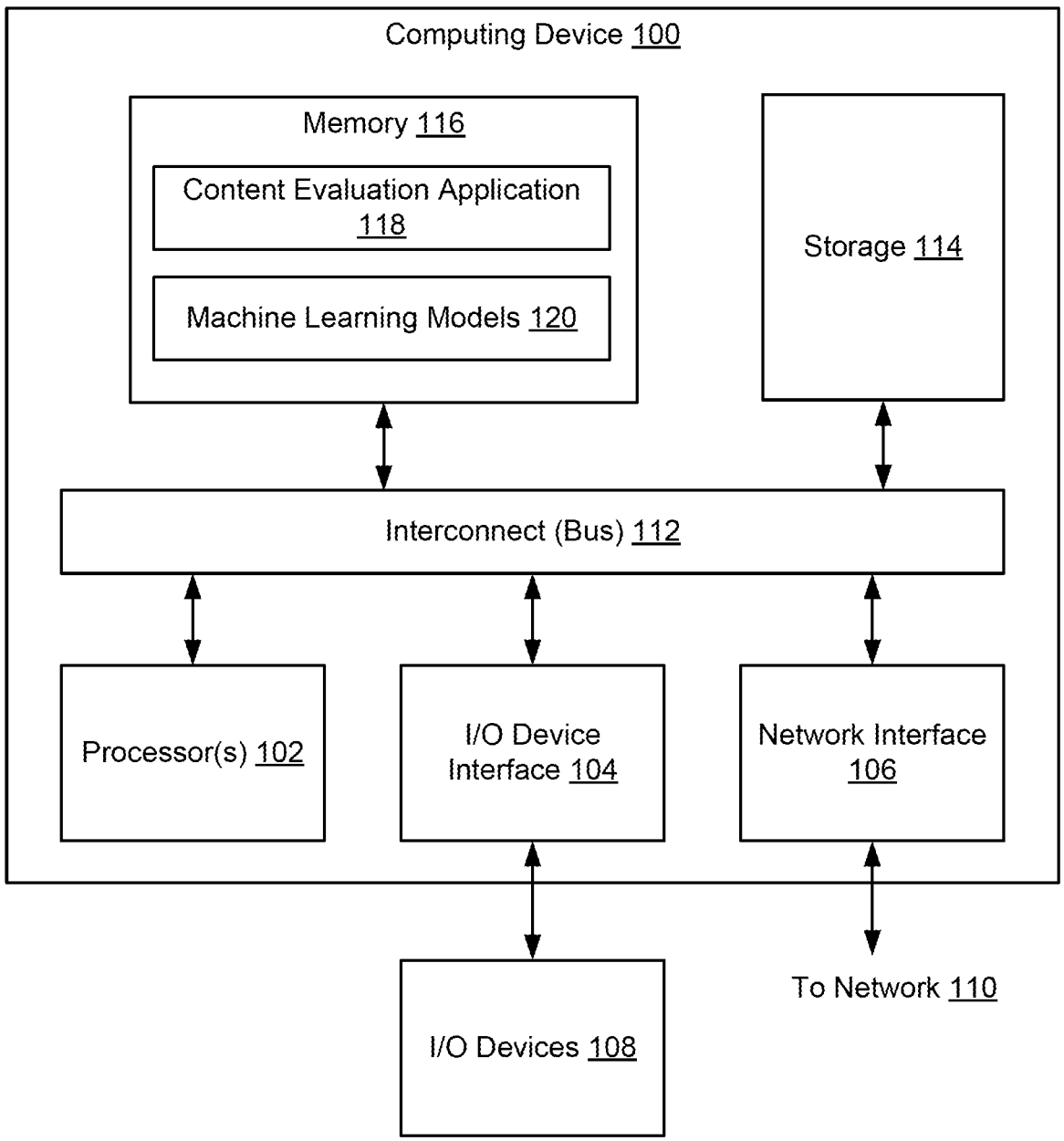
FIG. 1 illustrates a computing device configured to implement one or more aspects of the present disclosure, according to various embodiments.

FIG. 1 illustrates a computing device 100 configured to implement one or more aspects of the present disclosure, according to various embodiments. As shown, computing device 100 includes an interconnect (bus) 112 that connects one or more processing unit(s) 102, an input/output (I/O) device interface 104 coupled to one or more input/output (I/O) devices 108, memory 116, a storage 114, and a network interface 106 connected to a network 110.

Computing device 100 includes a server computer, a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and that any other technically feasible configurations fall within the scope of the present disclosure.

Processing unit(s) 102 includes any suitable processor implemented as a central processing unit (CPU), a graphics processing unit (GPU), an application-specific integrated circuit (ASIC), a field programmable gate array (FPGA), an artificial intelligence (AI) accelerator such as a tensor processing unit (TPU), any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing embodiment executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 includes any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Content evaluation application 118 and one or more machine learning models 120 can be stored in storage 114 and loaded into memory 116 when executed.

Memory 116 includes a random-access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processing unit(s) 102 and application data associated with said software programs, including content evaluation application 118 and one or more machine learning models 120. In some embodiments, content evaluation application 118 trains one or more machine learning models 120 that can be used to generate output indicating the likelihood of success of a media content based on audience reactions while viewing the media content. In some embodiments, content evaluation application 118 uses one or more trained machine learning models 120 to generate output indicating the likelihood of success of a media content based on audience reactions while viewing the media content. Content evaluation application 118 and the one or more machine learning models 120 are described in further detail below with respect to FIGS. 2 and 3.

It will be appreciated that the system shown herein is illustrative and that variations and modifications are possible. Although FIG. 1 illustrates content evaluation application 118 and the one or more machine learning models 120 executing on the same computing device 100, content evaluation application 118 and each machine learning model 120 can execute on different computing devices. Further, the functionality included in content evaluation application 118 can be divided across any number of applications or other software that are stored and execute via any number of devices that are located in any number of physical locations. For example, a first application can be configured to generate one or more machine learning models and a second application can be configured to generate predictions using the one or more machine learning models. Each application can execute on a different computing device.

Figure 2:
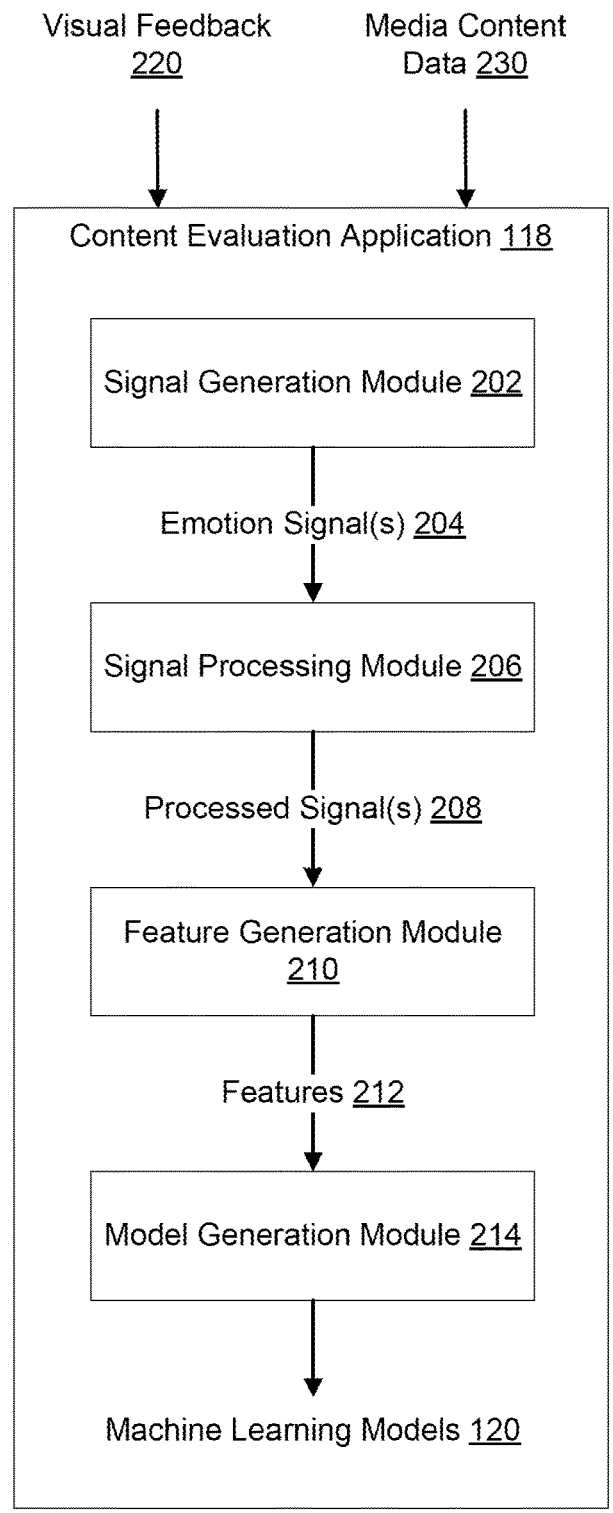
FIG. 2 is a more detailed illustration of the content evaluation application of FIG. 1, according to various embodiments.

FIG. 2 is a more detailed illustration of the content evaluation application 118 of FIG. 1, according to various embodiments. As shown in FIG. 2, content evaluation application 118 includes, without limitation, signal generation module 202, signal processing module 206, feature generation module 210, and model generation module 214.

In some embodiments, content evaluation application 118 receives visual feedback 220 associated with one or more media content items. A media content item could be any audio and/or visual content of any length, such as a movie, an episode of a television show, a scene from a movie or television show, an advertisement, a movie or television show trailer, a song, an audio recording, a video clip, an audio clip, or an image. A television show can be, for example and without limitation, a show that is traditionally broadcast on television (e.g., local and/or cable television network), a show that is only available on a streaming platform, a direct-to-video show, and/or the like. For each media content item, visual feedback 220 captures the face(s) of one or more audience members while viewing and/or listening to the media content item. In some embodiments, visual feedback 220 includes one or more videos and/or one or more sets of images. Each video frame or image corresponds to a specific point in time of the media content item and captures the face(s) of the one or more audience members when viewing and/or listening to the media content item at the corresponding point in time.

Additionally, as shown in FIG. 2, content evaluation application 118 receives media content data 230 associated with the one or more media content items. The media content data 230 indicates success metrics associated with the media content item. The success metrics include one or more metrics associated with evaluating the success of the media content item. For example, if the one or more media content items are episodes of different television shows, the media content data 230 could indicate, for each media content item, whether audience members indicated they would view the television show, whether the television show was selected for broadcast or inclusion in a media library, an episode rating associated with the episode of the television show, an overall rating associated with the television show, the viewer count for the episode, the audience retention rate for the television show, streaming platform performance, and the like. The success metrics for a media content item could vary depending on the content type of the one or more media content items. Additionally, the media content data 230 could include data indicating, for each media content item, characteristics of the media content item. The characteristics of the media content item could include for example, a type of media content of the media content item, a genre of the media content item, a length of the media content item, and the like.

Content evaluation application 118 generates one or more machine learning models 120 based on the visual feedback

220 and media content data 230. Each machine learning model 120 is trained to receive input data associated with visual feedback for a given media content item and generate output data indicating a value of a success metric associated with the given media content item.

In various embodiments, content evaluation application 118 receives visual feedback 220 and media content data 230 corresponding to a specific type of media content and generates one or more machine learning models 120 for evaluating the specific type of media content. For example, content evaluation application 118 could generate a first set of one or more machine learning models 120 for evaluating movies and a second set of one or more machine learning models 120 for evaluating television shows.

In various embodiments, content evaluation application 118 receives visual feedback 220 and media content data 230 corresponding to one or more media content items of a specific genre. Content evaluation application 118 generates one or more machine learning models 120 for evaluating the specific genre. In some embodiments, content evaluation application 118 receives visual feedback 220 and media content data 230 corresponding to a plurality of media content items of multiple genres. Content evaluation application 118 divides the plurality of media content items into different sets based on the genre of the media content items and generates a different set of machine learning models 120 for each genre. Additionally, the genres could be associated with a specific type of media content. For example, content evaluation application 118 could generate a first set of one or more machine learning models 120 for evaluating drama television shows and a second set of one or more machine learning models 120 for evaluating comedy television shows.

In operation, signal generation module 202 processes the visual feedback 220 and generates a set of emotion signals 204 corresponding to the visual feedback 220. Each emotion signal 204 corresponds to a given audience member and a given media content item. The emotion signal 204 indicates the strength of an emotion expressed by the audience member at different times while viewing and/or listening to the media content item.

In some embodiments, if an item of visual feedback 220 corresponds to a single audience member, then signal generation module 202 generates one or more emotion signals 204 corresponding to the single audience member. If an item of visual feedback 220 corresponds to multiple audience members, then signal generation module 202 generates one or more emotion signals 204 for each audience member included in the multiple audience members. For example, if visual feedback 220 includes a video of a group of people, then signal generation module 202 identifies each person captured in the video and generates an emotion signal for each person.

In some embodiments, for each item of visual feedback, signal generation module 202 generates one or more emotion signals 204, where each emotion signal 204 corresponds to a different emotion or emotion category. An emotion could be any emotion that can be determined based on analyzing a facial expression of a person, such as happiness, anger, concentration, calm, relaxation, fear, sadness, and the like. An emotion category corresponds to a group of emotions with a shared trait, such as positive emotions, negative emotions, high emotional arousal emotions, and low emotional arousal emotions. Positive emotions could include any emotion with a positive connotation, such as happiness, excitement, playfulness, calmness, relaxation, and/or the like. Negative emotions could include any emotion with a negative connotation, such as anger, fear, boredom, sadness, anxiousness, depression, and/or the like. High emotional arousal emotions could include any emotion connected to heightened physiological activity, such as excitement, playfulness, happiness, fear, anger, anxiousness, and/or the like. Low emotional arousal emotions could include any emotion connected to low or lowered physiological activity, such as calmness, relaxation, boredom, depression, and/or the like.

In some embodiments, to generate an emotion signal 204, signal generation module 202 analyzes an image or video frame included in an item of visual feedback 220 and generates a value that quantifies an emotion of an audience member captured in the image or video frame. The value corresponds to a point in time of playback of the media content item associated with the image or video frame. Signal generation module 202 analyzes a plurality of images or video frames to generate a corresponding plurality of values that quantify the emotional response of the audience member at different points in time of playback of the media content item. Signal generation module 202 can analyze an image or video frame using any technically-feasible computer vision and image analysis techniques. In some embodiments, signal generation module 202 applies a machine learning model that receives an image as input and outputs a value quantifying an emotional response based on the image.

In some embodiments, signal generation module 202 performs one or more pre-processing operations on an image or video frame prior to analyzing the image or video frame. The one or more pre-processing operations include, for example, rotating, cropping, resizing, landmark alignment, color normalization, and the like. In some embodiments, signal generation module 202 normalizes the image or video frame to align landmarks on a face of an audience member depicted in the image or video frame. An image or video frame can be normalized in any technically-feasible manner, including using face alignment techniques to compute an affine transformation that rotates, scales, translates, etc. the image, and/or cropping the image. For example, an image can be rotated and scaled so that the eyes of the face lie on a predefined horizontal line and have a predefined ocular distance. In some embodiments, signal generation module 202 crops the image or video frame around the portion of the image or video frame depicting the face of the audience member. If the image or video frame depicts multiple audience members, signal generation module 202 could crop the image or video frame to generate multiple cropped images, where each cropped image depicts a face of a different audience member. Additionally, signal generation module 202 could normalize the cropped image or video frame. In some embodiments, signal generation module 202 scales the image or video frame, or a cropped portion of the image or video frame, to a specific size. Signal generation module 202 analyzes the processed image or video frame to generate a value that quantifies an emotion of an audience member captured in the processed image or video frame.

One benefit of analyzing visual feedback to generate values that quantify emotional response of audience members is that the generated values are more accurate compared to approaches that use surveys and dial tests to measure emotional response. In particular, because surveys and dial tests rely on audience members self-reporting measurements, these approaches introduce multiple sources of response bias, including fatigue or recall bias, which can produce inaccurate results. In contrast, the content evaluation application 118 can measure unconscious emotional responses of the audience members. For example, an audience member may have emotional responses that the audience member was not be aware of or could not recall properly when answering survey questions. Because these emotional responses are reflected in the facial expressions of the audience member, these emotional responses can be successfully captured in the emotion signal 204. Additionally, the content evaluation application 118 can more accurately measure the strength of an emotional response. For example, the self-reported emotional response from an audience member could be much higher or much lower compared to the actual emotional response experienced by the audience member. Accordingly, using the above techniques, content evaluation application 118 produces more reliable audience response measurements compared to approaches that rely on self-reported responses from audience members.

Signal processing module 206 receives one or more emotion signals 204 and processes the one or more emotion signals 204 to generate one or more processed signals 208. In some embodiments, signal processing module 206 receives a plurality of emotion signals 204 corresponding to a given emotion and a given media content item. Signal processing module 206 aggregates the plurality of emotion signals 204 into a single emotion signal that represents the overall emotional response over time of a group of audience members for the given media content item. Signal processing module 206 can aggregate the plurality of emotion signals 204 using any technically-feasible techniques. In some embodiments, signal processing module 206 aggregates the plurality of emotion signals 204 using a peak synchronization algorithm.

In some embodiments, processing an emotion signal 204 includes smoothing the emotion signal 204. Smoothing an emotion signal 204 reduces the amount of noise included in the emotion signal 204. In some embodiments, signal processing module 206 aggregates a plurality of emotion signals 204 to generate a single emotion signal 204 and applies one or more signal smoothing algorithms to smooth the single emotion signal 204. In some embodiments, signal processing module 206 smooths each emotion signal 204 corresponding to a given emotion and a given media content item prior to aggregating the plurality of emotion signals 204 into a single emotion signal 204. Signal processing module 206 can use any suitable signal smoothing algorithms or techniques to smooth an emotion signal 204. In some embodiments, signal processing module 206 uses a locally estimated scatterplot smoothing (LOESS) smoother.

In some embodiments, processing an emotion signal 204 includes identifying one or more peaks included in the emotion signal 204. Signal processing module 206 can use any suitable peak detection algorithms or techniques to identify peaks included in an emotion signal 204. In some embodiments, identifying the one or more peaks includes identifying one or more portions of the emotion signal 204 where the value is above a threshold amount. The corresponding processed emotion signal 204 indicates different points in time of playback of the media content item where the strength of the emotional response was over the threshold amount. In some embodiments, the same threshold amount is used for different emotions or emotion categories. In other embodiments, each emotion or emotion category is associated with a respective threshold amount. Signal processing module 206 determines a specific emotion or emotion category associated with the emotion signal 204 and identifies one or more peaks included in the emotion signal 204 based on the threshold amount associated with the specific emotion or emotion category.

In some embodiments, signal processing module 206 smooths an emotion signal 204 and identifies one or more peaks included in the smoothed motion signal 204. In some embodiments, signal processing module 206 aggregates a plurality of emotion signals 204 into a single emotion signal 204 and identifies one or more peaks included in the single emotion signal 204. In other embodiments, signal processing module 206 aggregates the plurality of emotion signals 204 into a single emotion signal 204, smooths the single emotion signal 204, and identifies one or more peaks included in the smoothed emotion signal 204.

Figure 3:
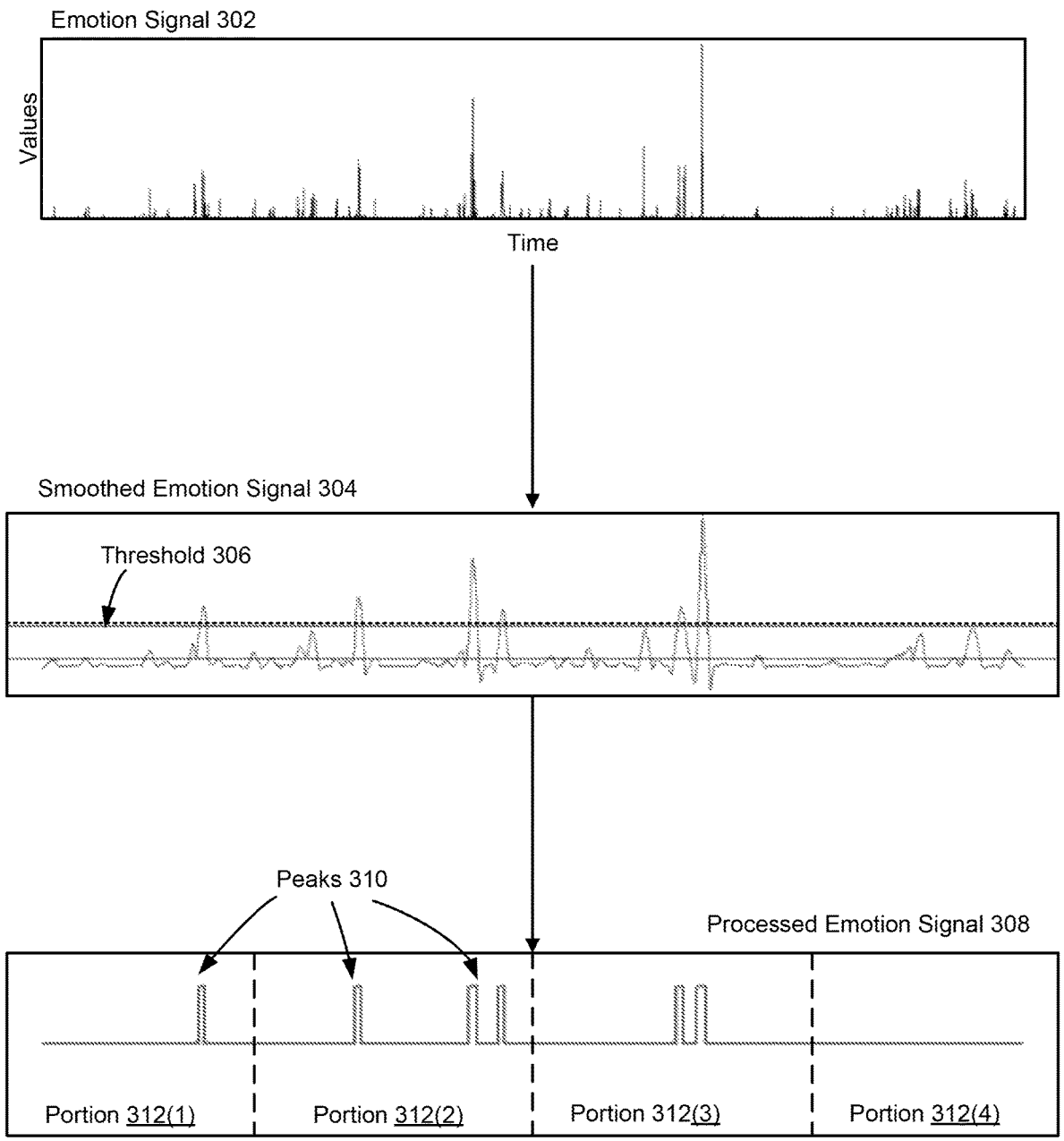
FIG. 3 illustrates an exemplar emotion signal, according to various embodiments.

FIG. 3 illustrates an exemplar emotion signal 302, according to various embodiments. Emotion signal 302 includes a plurality of values corresponding to the strength of an emotion expressed by the audience member over a period of time while viewing and/or listening to the media content item. As shown in FIG. 3, one or more signal smoothing algorithms are applied to emotion signal 302 to generate a smoothed emotion signal 304. Subsequently, based on comparison to a threshold 306, one or more peaks 310 are identified from the smoothed emotion signal 304. The one or more peaks 310 correspond to portions of the smoothed emotion signal 304 where the value quantifying the emotion exceeds threshold 306. In some embodiments, the threshold 306 is a pre-selected value. For example, signal processing module 206 could be configured to use a given threshold value for processing emotion signals. As another example, signal processing module 206 could be configured to use a different threshold value for different types of emotion signals, such as for emotion signals corresponding to different emotions or emotion categories. In some embodiments, the threshold 306 for an emotion signal 302 is computed based on the values included in the emotion signal 302. Any technically-feasible algorithm or technique for selecting a peak detection threshold can be used to compute a threshold 306 based on an emotion signal 302. As discussed in further detail below, in some embodiments, the threshold 306 can be specified and/or modified by model generation module 214 to train machine learning models 120 using different sets of processed emotion signals.

A processed emotion signal 308 is generated that indicates the starting point, ending point, and duration of the one or more peaks 310. As shown in FIG. 3, the processed emotion signal 308 indicates a first value if a point in time corresponds to a peak, and a second value if a point in time does not correspond to a peak. However, in other embodiments, the processed emotion signal 308 could keep the original value included in the emotion signal 302 and/or the smoothed emotion signal 304 of points in time that correspond to a peak. If a point in time does not correspond to a peak, then signal processing module 206 could set the value associated with the point in time to a minimum value (e.g., zero) or other value that indicates that the point in time does not correspond to a peak.

Feature generation module 210 receives one or more processed signals 208 and generates a set of features 212 based on the one or more processed signals 208. In some embodiments, feature generation module 210 generates, for each processed signal 208, one or more features 212 associated with the media content item corresponding to the processed signal 208 and the emotion or emotion category associated with the processed signal 208.

In some embodiments, the one or more features 212 for a processed signal 208 include one or more count-based features. A count-based feature is based on the peaks included in the processed signal 208, such as the total number of peaks, the total duration of peaks, the average duration of peaks, the longest peak, the shortest peak, the number of peaks at the beginning (e.g., first five minutes) of the media content item, the number of peaks at the end (e.g., last five minutes) of the media content item, the number of peaks within different portions of the media content item, and the like.

In some embodiments, the media content item includes a plurality of portions. Feature generation module 210 divides the processed signal 208 into a plurality of corresponding portions and determines, for each portion of the processed signal 208, a number of peaks within the portion. In some embodiments, feature generation module 210 divides each processed signal 208 into a given number of portions (e.g., three or four). In some embodiments, the number and length of each portion of a media content item varies depending on the type of media content. For example, a television show could be divided into acts, a movie could be divided into scenes, a song could be divided into verses, and so forth. Additionally, the number and length of each portion could vary depending on the genre of media content. For example, drama television shows could be divided into a first number of acts and comedy television shows could be divided into a second number of acts.

In some embodiments, feature generation module 210 determines a type of the media content item and/or a genre of the media content item based on the media content data 230. Feature generation module 210 determines a number of portions to divide the processed signal 208 into based on the type of the media content item and/or the genre of the media content item.

In some embodiments, the media content data 230 includes data indicating how the media content item is divided into different portions, and feature generation module 210 divides the processed signal 208 into different portions based on the media content data 230.

Count-based features can be used to identify moments of the media content item that were well-received by audience members or elicited a desired emotional response, as well as moments that were not well-received or did not elicit a desired emotional response. Additionally, the presence of certain count-based features could be an indicator of the success of the media content item. For example, if a comedy television show did not include any happiness peaks within the first portion of the show, the lack of happiness peaks could be an indicator that the show will not be successful.

In some embodiments, the one or more features 212 for a processed signal 208 include one or more spatial features. A spatial feature is based on the location of the peaks within the processed signal 208, such as the amount of time (e.g., seconds) from the beginning of the media content item until the first peak, the amount of time between the last peak and the end of the media content item, the average amount of time between peaks, the amount of time from the beginning of the media content item until the largest value, the smallest amount of time between peaks, the largest amount of time between peaks, and the like.

Spatial features can be used to provide a different perspective of a processed signal 208 from count-based features. Spatial features indicate the spacing, distribution, and timing of the peaks within the processed signal 208. Even if two processed signals 208 included the same number of peaks, the spacing, distribution, and timing of the peaks could be indicators of whether one media content item is more likely to be successful than the other.

Referring to FIG. 3, feature generation module 210 generates a set of features based on processed emotion signal 308. The set of features could include, for example, the number of peaks 310 included in processed emotion signal 308, a total duration of the peaks 310, the number of peaks 310 included in the first five minutes of time, the number of peaks 310 included in the last five minute of time, the amount of time until the first peak 310, the average time between the peaks 310, the amount of time between the last peak 310 and the end of processed emotion signal 308 (corresponding to the end of the media content item), and such. As shown in FIG. 3, processed emotion signal 308 is divided into portions 312(1)-312(4). The set of features could include, for each portion 312, the number of peaks included in each portion of processed emotion signal 308.

In some embodiments, feature generation module 210 normalizes one or more of the features 212. Normalizing the one or more features 212 includes scaling each feature based on a length of the media content item compared to a target media content item length. For example, feature generation module 210 could compute the proportion between a length of the media content item and the target media content item length and scale each feature according to the computed proportion. In some embodiments, each type of media content is associated with a different target media content item length. Feature generation module 210 determines a type of the media content item and scales one or more of the features 212 based on the target media content item length associated with the type of media content. For example, movies could be associated with a first media content item length and television shows could be associated with a second media content item length. In some embodiments, each genre of a given type of media content is associated with a different target media content length. For example, children's movies could be associated with a first media content item length and action movies could be associated with a second media content item length.

In some embodiments, feature generation module 210 includes both a feature and the corresponding normalized feature in the set of features 212. For example, a set of features 212 could include a number of peaks, a normalized number of peaks, an amount of time to the first peak, a normalized amount of time to the first peak, an amount of time until the peak with the highest value, a normalized amount of time until the peak with the highest value, a largest amount of time between peaks, a normalized largest amount of time between peaks, and the like.

Model generation module 214 receives a set of features 212 and trains one or more machine learning models 120 based on the set of features 212. Each trained machine learning model 120 receives one or more features 212 associated with a given media content item and generates output indicating a predicted success metric associated with the given media content item. A success metric is any attribute or value that can be used to evaluate the success of a media content item. The success metrics for a media content item can vary depending on the type of media content. For example, a success metric for a television show could be whether audience members indicated they would view the television show, whether the television show was selected for broadcast or inclusion in a media library, an episode rating associated with the episode of the television show, an overall rating associated with the television show, the viewer count for the episode, the audience retention rate for the television show, streaming platform performance, and the like. The success metric for a movie could be whether the movie was selected for production, an overall rating associated with the movie, a rating associated with a given audience demographic, box office performance, streaming platform performance, and the like.

The set of features 212 is associated with one or more media content items. Model generation module 214 determines, for each media content item, actual values of one or more success metrics associated with the media content item based on the media content data 230 for the media content item. Model generation module 214 trains one or more machine learning models 120 using the set of features 212 as training input and the values of the one or more success metrics for the one or more media content items as training output. Each machine learning model 120 can be any technically-feasible machine learning model, such as a regression model, classification model, support vector machine, decision tree, random forest, gradient boosted tree, naïve Bayes classifier, Bayesian network, hierarchical model, ensemble model, and the like.

In some embodiments, model generation module 214 determines one or more success metrics associated with the set of features 212. For example, if the set of features 212 are associated with media content items of a specific type of media content, model generation module 214 determines one or more success metrics associated with the specific type of media content. In some embodiments, model generation module 214 stores data indicating, for each type of media content, one or more success metrics associated with the type of media content. In some embodiments, model generation module 214 determines, based on the media content data 230, one or more success metrics indicated by the media content data 230. For example, the media content data 230 could include, for one or more media content items, values for one or more success metrics. Model generation module 214 identifies the one or more success metrics whose values are included in the media content data 230. For each success metric, model generation module 214 trains one or more machine learning models 120 using the set of features 212 and the actual values for the success metric.

In some embodiments, model generation module 214 generates a plurality of machine learning models 120 based on a set of features 212 and a set of success metric values for a given success metric. Each machine learning model 120 can be a different type of model, trained using a different subset of features 212, and/or tuned with different hyperparameters. In some embodiments, tuning hyperparameters for one or more machine learning models 120 includes tuning parameters used by signal processing module 206 to process the one or more emotion signals 204. For example, the parameters used by a signal smoothing algorithm could be adjusted for smoothing the one or more emotion signals 204. As another example, the threshold for identifying peaks in an emotion signal 204 or smoothed emotion signal 204 could be modified. As a result, signal processing module 206 generates, from a set of emotion signals 204, different sets of processed emotion signals 208. Accordingly, the features 212 generated based on each set of processed emotion signals 208 can also be different. The plurality of machine learning models 120 include, for each set of features 212 generated based on a different set of processed emotion signals 208, one or more machine learning models 120 trained based on the set of features 212.

Model generation module 214 selects one or more machine learning models 120 from the plurality of machine learning models 120, such as machine learning models 120 with the highest accuracy and/or lowest error rate. Model generation module 214 can generate a plurality of machine learning models 120 and select one or more machine learning models 120 using any technically-feasible algorithms or techniques. In some embodiments, model generation module 214 generates a plurality of machine learning models 120 and selects one or more machine learning models 120 using a grid search algorithm.

In some embodiments, if the set of features 212 is associated with media content items of different types and/or genres of media content, model generation module 214 divides the set of features 212 into subsets corresponding to the different types and/or different genres of media content. Model generation module 214 generates one or more machine learning models 120 associated with each type and/or genre of media content based on the subset of features 212 corresponding to the type and/or genre of media content.

In some embodiments, the set of features 212 is associated with one or more media content items of a specific type of media content (e.g., movies, television shows, songs, advertisements). Each trained machine learning model 120 is trained to generate output indicating a predicted success metric that is associated with the specific type of media content. Additionally, in some embodiments, the set of features 212 is associated with one or more media content items of a specific genre of a specific type of media content. Each trained machine learning model 120 is associated with the specific genre of the specific type of media content. Because the machine learning model is trained using features associated with the specific genre, the machine learning model can generate more accurate results for media content items of the specific genre compared to machine learning models that are trained using features associated with media content items from a different genre or from across multiple genres.

Another benefit of generating the set of features 212 for training the machine learning models 120 is that the number of features and characteristics associated with a media content item and with audience consumption of the media content items are reduced to the features identified in the set of features 212. Furthermore, because the set of features 212 are generated based on the reactions of audience members while viewing and/or listening to media content items, the set of features 212 are indicative of whether and how much the audience members like the media content items. The machine learning models 120 trained using the set of features 212 are, therefore, more accurate compared to models that do not account for the reactions of audience members and avoid consuming a large amount of processing resources by accounting for a large number of features that might not necessarily be relevant to audience appeal.

In addition, as explained in further detail below, because the features that a trained machine learning model uses to generate predictions are both known and interpretable, information relating to the features can be provided to users in order to provide additional details in support of the prediction generated by the machine learning model. For example, users could draw conclusions regarding why the machine learning model generated a given prediction by comparing the feature values for a media content item to historical feature values of other media content items. Furthermore, the feature values can be used by the content evaluation application 118 to identify features that could be targeted to improve the predicted success metrics, portions of a media content item that were well-received by audience members, portions of the media content item that were not well-received by audience members, and the like.

Content evaluation application 118 stores the one or more machine learning models 120, for example in storage 114. The one or more machine learning models 120 can be deployed to any suitable application(s), including content evaluation application 118 itself or instances of content evaluation application 118 executing on other computing devices. In some embodiments, each machine learning model 120 is associated with a specific type of media content. Content evaluation application 118 stores data that indicates the type of media content associated with each machine learning model 120, for example, in metadata corresponding to each machine learning model 120. In some embodiments, each machine learning model 120 is associated with a specific genre of media content. Content evaluation application 118 stores data that indicates the genre associated with each machine learning model 120, for example, in the metadata corresponding to each machine learning model 120. In some embodiments, content evaluation application 118 stores other types of data associated with a machine learning model 120, such as data indicating the types of features used as input for the machine learning model 120, the type of success metric generated by the machine learning model 120, parameters associated with generating the features used as input for the machine learning model 120 (e.g., peak detection threshold values and smoothing algorithm parameters), and/or the like.

It will be appreciated that the system shown herein is illustrative and that variations and modifications are possible. Although FIG. 2 illustrates signal generation module 202, signal processing module 206, feature generation module 210, and model generation module 214 as part of content evaluation application 118, one or more of signal generation module 202, signal processing module 206, feature generation module 210, and model generation module 214 can be included in an application separate from content evaluation application 118. For example, signal generation module 202 could be included in an application that processes visual feedback. Content evaluation application 118 could receive emotion signals 204 from the other application instead of receiving visual feedback 220. As another example, content evaluation application 118 could generate a set of features 212 to another application that generates machine learning models. The other application could generate the one or more models 120 based on the set of features 212 received from content evaluation application 118.

Figure 4:
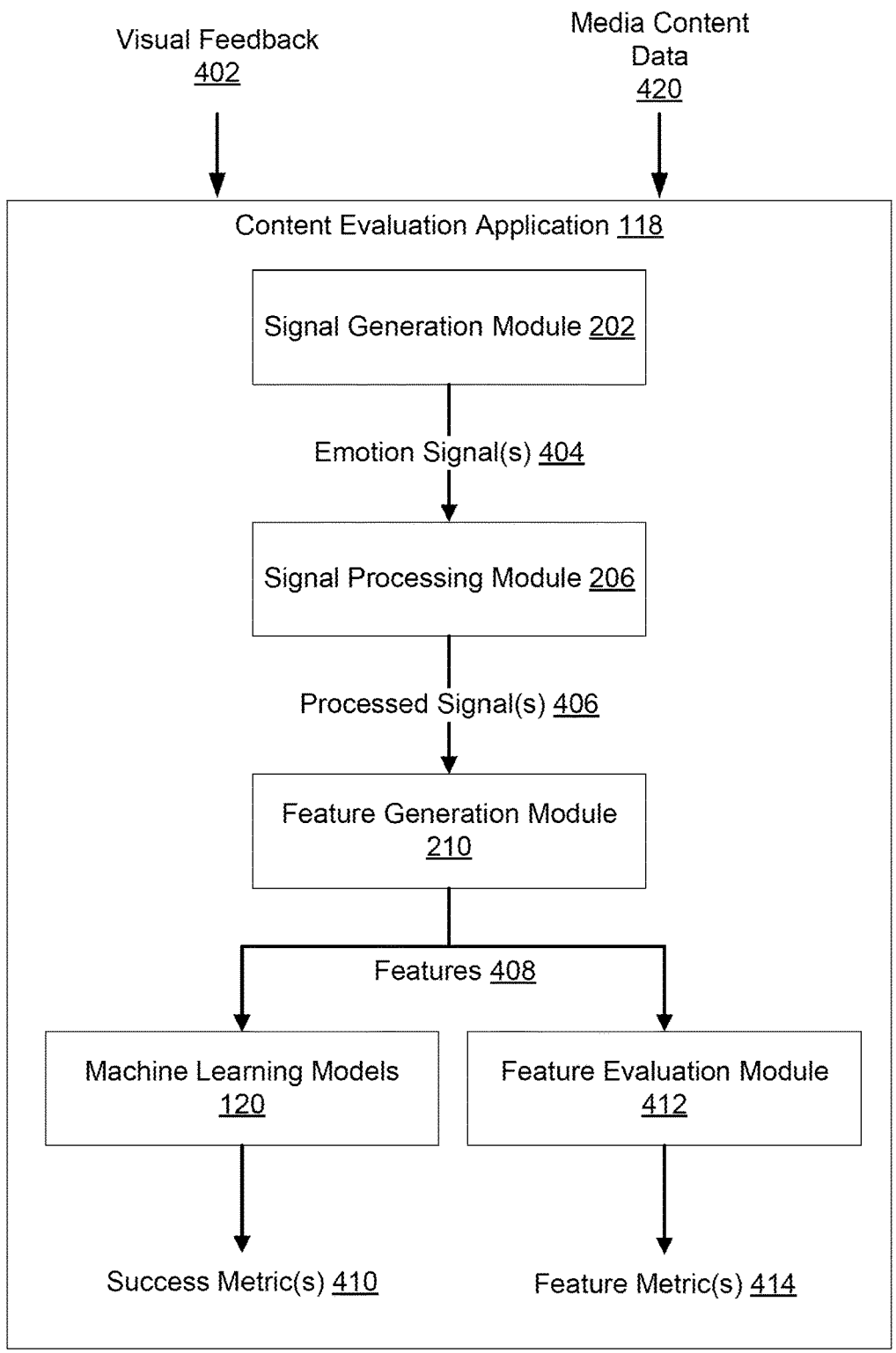
FIG. 4 is a more detailed illustration of the content evaluation application of FIG. 1, according to various other embodiments.

FIG. 4 is a more detailed illustration of the content evaluation application 118 of FIG. 1, according to various other embodiments. As shown in FIG. 4, content evaluation application 118 includes, without limitation, signal generation module 202, signal processing module 206, feature generation module 210, feature evaluation module 412, and one or more machine learning models 120.

In some embodiments, content evaluation application 118 receives visual feedback 402 associated with a media content item. The media content item could be any audio and/or visual content of any length, such as a movie, an episode of a television show, a scene from a movie or television show, an advertisement, a movie or television show trailer, a song, an audio recording, a video clip, an audio clip, or an image. The visual feedback 402 captures the face(s) of one or more audience members while viewing and/or listening to the media content item. In some embodiments, visual feedback 402 includes a video of the one or more audience members. Each point in time of the video captures the face(s) of the one or more audience members while viewing and/or listening to the media content item at a corresponding point in time. In some embodiments, visual feedback 402 includes one or more images of the one or more audience members. Each image captures the face(s) of the one or more audience members while viewing and/or listening to the media content item at a specific point in time. In some embodiments, visual feedback 402 includes visual feedback associated with a single media item that is being evaluated, while visual feedback 220 includes visual feedback associated with multiple media items.

Content evaluation application 118 generates, using one or more machine learning models 120, one or more success metrics 410 for the media content item based on the visual feedback 402. Additionally, in some embodiments, content evaluation application 118 generates one or more feature metrics 414 associated with the media content item.

Additionally, as shown in FIG. 4, content evaluation application 118 receives media content data 420 associated with the media content item. The media content data 420 indicates one or more characteristics of the media content item, such as the type of media content of the media content item, the genre of the media content item, the length of the media content item, and the like. As described in further detail below, generating the one or more success metrics 410 and/or the one or more feature metrics 414 can be further based on the characteristics of the media content item. In various embodiments, the media content data 420 associated with a media content item includes different data from the media content data 230 discussed above with reference to FIG. 2. For example, to train the one or more machine learning models 120, the media content data 230 includes success metrics associated with media content items. The success metrics correspond to actual, real-world metrics associated with the media content items. In contrast, media content data 420 does not include success metrics associated with the media content item.

In operation, signal generation module 202 processes the visual feedback 402 and generates a set of emotion signals 404 corresponding to the visual feedback 402. In some embodiments, signal generation module 202 generates, for one or more emotions or emotion categories, one or more emotion signals 404 associated with the emotion or emotion category. Each emotion signal 404 corresponds to an audience member associated with visual feedback 402 and indicates the strength of a given emotion, or the strength of one or more emotions within a given emotion category, expressed by the audience member at different times while viewing and/or listening to the media content item.

In some embodiments, to generate an emotion signal 404 for a given emotion or emotion category, signal generation module 202 analyzes an image or video frame included in visual feedback 402 and generates a value that quantifies the strength of the emotion, or of one or more emotions within the emotion category, of the audience member captured in the image or video frame. For a set of images that capture the reactions of an audience member at different points in time while the audience member is consuming the media content item, the values corresponding to the set of images indicate the strength of the emotion at the different points in time. For a video that captures the reactions of an audience member over time while the audience member is consuming the media content item, the values corresponding to the video frames of the video indicate the strength of the emotion over time.

In some embodiments, if an image or video frame included in visual feedback 402 captures multiple audience members, signal generation module 202 identifies each audience member captured in the image or video frame. For each audience member, signal generation module 202 analyzes the portion of the image or video frame that contains the audience member and generates a value corresponding to the audience member. Analyzing the portion of the image or video frame could include cropping the image or video frame to include only the portion of the image or video frame that contains the audience member and analyzing the cropped image or video frame.

In some embodiments, signal generation module 202 performs one or more pre-processing operations on an image or video frame prior to analyzing the image or video frame. The one or more pre-processing operations include, for example, rotating, cropping, resizing, landmark alignment, color normalization, and the like. In some embodiments, signal generation module 202 normalizes the image or video frame to align landmarks on a face of an audience member depicted in the image or video frame. Signal generation module 202 analyzes the processed image or video frame to generate the value.

Signal processing module 206 receives one or more emotion signals 404 and processes the one or more emotion signals 404 to generate one or more processed signals 406. As discussed above, processing the one or more emotion signals 404 could include aggregating multiple emotion signals 404 into a single emotion signal, smoothing one or more emotion signals 404 or an aggregated emotion signal, and/or identifying one or more peaks included in each emotion signal 404 or aggregated emotion signal.

Feature generation module 210 receives one or more processed signals 406 and generates a set of features 408 based on the one or more processed signals 406. In some embodiments, feature generation module 210 generates, for each processed signal 406, one or more features 408 associated with the emotion or emotion category associated with the processed signal 406.

In some embodiments, the one or more features 408 for a processed signal 406 include one or more count-based features and/or one or more spatial features. A count-based feature is based on the peaks included in the processed signal 406, such as the total number of peaks, the total duration of peaks, the average duration of peaks, the longest peak, the shortest peak, the number of peaks at the beginning (e.g., first five minutes) of the media content item, the number of peaks at the end (e.g., last five minutes) of the media content item, the number of peaks within different portions of the media content item, and the like. A spatial feature is based on the location of the peaks within the processed signal 208, such as the amount of time (e.g., seconds) from the beginning of the media content item until the first peak, the amount of time between the last peak and the end of the media content item, the average amount of time between peaks, the amount of time from the beginning of the media content item until the largest value, the smallest amount of time between peaks, the largest amount of time between peaks, and the like.

In some embodiments, the media content item includes a plurality of portions. Feature generation module 210 divides each processed signal 406 into a plurality of corresponding portions and determines, for each portion of a processed signal 406, a number of peaks within the portion. In some embodiments, feature generation module 210 divides each processed signal 406 into the same number of portions (e.g., three or four). In some embodiments, feature generation module 210 determines a number of portions and/or a length of each portion based on the type of media content of the media content item. Additionally, the number of portions and/or the length of each portion could be based on the genre of the media content item. In some embodiments, feature generation module 210 determines a type of media content of the media content item and/or a genre of the media content item based on the media content data 420. Feature generation module 210 determines a number of portions to divide each processed signal 406 into and/or a length of each portion based on the type of the media content item and/or the genre of the media content item. In some embodiments, the media content data 420 includes data indicating how the media content item is divided into different portions, and feature generation module 210 divides each processed signal 406 into different portions based on the media content data 420.

In some embodiments, feature generation module 210 normalizes one or more features 408 included in the set of features 408. Normalizing the one or more features 408 includes scaling each feature 408 based on a length of the media content item compared to a target media content item length. In some embodiments, each type of media content is associated with a different target media content item length. Feature generation module 210 determines a type of the media content item and scales one or more of the features 408 based on the target media content item length associated with the type of media content. In some embodiments, each genre of a given type of media content is associated with a different target media content length. Feature generation module 210 determines a type of the media content item and scales one or more of the features 408 based on the target media content item length associated with the genre of the media content item.

In some embodiments, feature generation module 210 includes both a feature and the corresponding normalized feature in the set of features 408. For example, a set of features 408 could include a number of peaks, a normalized number of peaks, an amount of time to the first peak, a normalized amount of time to the first peak, an amount of time until the peak with the highest value, a normalized amount of time until the peak with the highest value, a largest amount of time between peaks, a normalized largest amount of time between peaks, and the like.

Content evaluation application 118 provides the set of features 408 to one or more trained machine learning models 120. Each machine learning model 120 generates a corresponding success metric 410 based on the set of features 408. In some embodiments, content evaluation application 118 selects the one or more machine learning models 120 from a plurality of machine learning models 120 based on characteristics of the media content item. In some embodiments, content evaluation application 118 determines one or more characteristics of the media content item based on the media content data 420. The one or more characteristics could include, for example, the type of media content of the media content item and/or one or more genres or categories of the media content item. For example, each machine learning model 120 could be associated with a specific type of media content. Content evaluation application 118 selects one or more machine learning models 120 that are associated with the same type of media content as the media content item. As another example, each machine learning model 120 could be associated with a specific genre of a specific type of media content. Content evaluation application 118 selects one or more machine learning models 120 that are associated with the same genre and the same type of media content as the media content item. In some embodiments, if the media content item belongs to multiple genres, content evaluation application 118 selects, for each genre, one or more machine learning models 120 associated with the genre. In other embodiments, if the media content item belongs to multiple genres, content evaluation application 118 selects a genre from the multiple genres and selects one or more machine learning models 120 associated with the selected genre. For example, if the media content item is associated with a primary genre and one or more secondary genre, convent evaluation application 118 could select machine learning models 120 associated with the primary genre.

In some embodiments, content evaluation application 118 generates the emotion signals 404, processed signals 406, and/or features 408 based on the one or more selected machine learning models 120. For example, each machine learning model 120 could be stored with data indicating one or more features used as input for the machine learning model 120. Content evaluation application 118 generates emotion signals 404, processed signals 406, and features 408 based on the features used as input for a selected machine learning model 120. As another example, a machine learning model 120 could be stored with data indicating parameters to use when generating processed signals 406, such as a threshold value for peak detection or parameters for a signal smoothing algorithm. Content evaluation application 118 generates processed signals 406 using the parameters associated with a selected machine learning model 120.

In some embodiments, each machine learning model 120 generates a different type of success metric associated with the media content item. For example, if the media content item is associated with a television show, a first machine learning model could predict whether audience members would watch the television show, a second machine learning model could predict whether the television show would be selected for production, a third machine learning model could predict a rating associated with the television show, and so forth. In other embodiments, one or more machine learning models 120 generate the same type of success metric. In some embodiments, content evaluation application 118 outputs, for each type of success metrics, multiple predicted values corresponding to the success metric. Referring to the above example, multiple machine learning models could predict whether the television show would be selected for production. Content evaluation application 118 outputs the prediction generated by each machine learning model. In some embodiments, content evaluation application 118 combines the multiple predicted values to generate an aggregated predicted value, for example, by identifying the most common value or category, computing the average of a set of numeric values, and the like. Referring to the above example, content evaluation application 118 could combine the predictions generated by each machine learning model by determining whether more machine learning models predicted that the show would be selected for production or more machine learning models predicted that the show would not be selected for production.

Additionally, as shown in FIG. 4, content evaluation application 118 includes a feature evaluation model 412. Feature evaluation module 412 receives the set of features 408 and generates one or more feature metrics 414. Each feature metric 414 is a metric associated with a feature included in the set of features 408 and indicates how the feature compares to features of the same type (e.g., number of peaks, longest peak, shortest peak, total duration of peaks, time until first peak, etc.) that were generated for other media content items. For example, a feature metric 414 could indicate whether the feature had a higher value, lower value, or the same value as a specific feature, as the average of a set of features of the same type, the median of a set of features of the same type, and so on. The set of features of the same type could include features of the same type that were generated for other media content items of the same type of media content and/or the same genre.

In some embodiments, content evaluation application 118 stores features generated from different sets of visual feedback, such as features 408 and/or features 408. Additionally, content evaluation application 118 could store media content data 230 associated with features 408 and/or media content data 420 and/or success metrics 410 associated with features 408. Feature evaluation module 412 identifies the set of features of the same type based on the media content data associated with the stored features.

In some embodiments, feature evaluation module 412 identifies features associated with media content items with positive success metrics. A positive success metric could be, for example, a success metric with a positive categorization (e.g., a value of "yes"), a value that is above a threshold amount (e.g., a rating that is higher than an 8 out of 10, or 4 out of 5), and the like. Feature evaluation module 412 identifies a set of features that correspond to a media content item with positive success metrics based on the stored media content data and/or success metrics.

Content evaluation application 118 outputs the one or more success metrics 410 and/or the one or more feature metrics 414 to a user of content evaluation application 118. In some embodiments, content evaluation application 118 displays the success metric(s) 410 generated by the one or more machine learning models 120 and/or the feature metric(s) 414 generated by feature evaluation module 412 in a GUI. In some embodiments, content evaluation application 118 stores the success metric(s) 410 and/or feature metric(s) 414, for example in storage 114. The stored success metric(s) 410 and/or feature metric(s) 414 can be provided to other users for evaluation or to other applications for further processing and analysis. Additionally, content evaluation application 118 could store the set of features 408. The values included in the set of features 408 could be used, for example, by feature evaluation module 412 to analyze later generated features.

In some embodiments, content evaluation application 118 outputs descriptions corresponding to each success metric 410. The descriptions for a success metric 410 could describe, for example, what the success metric 410 represents (e.g., whether a show will be selected for production, whether audience members would watch the show, predicted audience rating, etc.), the different features evaluated by a machine learning model 120 to generate the success metric, and the feature values corresponding to the different features evaluated by the machine learning model.

In some embodiments, content evaluation application 118 outputs descriptions corresponding to each feature metric 414. The descriptions for a feature metric 414 could describe, for example, what the feature metric 414 represents (e.g., comparison with average values, comparison with values associated with shows that have positive success metrics, comparison with values associated with shows that have negative success metrics, etc.).

In some embodiments, content evaluation application 118 generates one or more suggested actions and/or one or more areas of improvement based on the one or more feature metrics 414. For example, content evaluation application 118 could identify one or more features 408 that differ from the average features of media content items that have positive success metrics. The media content items could be media content items of the same type as the media content item. Additionally, the media content items could be media content items of the same genre. For example, if the media content item was a comedy television show, content evaluation application 118 could determine that comedy television shows that audience members would want to watch have at least one happiness peak within the first five minutes. Content evaluation application 118 determines that the features 408 indicate no happiness peaks were present within the first five minutes and generates output indicating that the first five minutes of the media content item should be modified to generate at least one happiness peak.

In some embodiments, content evaluation application 118 generates a graphical user interface (GUI) for displaying the one or more success metrics 410, one or more descriptions associated with the one or more success metrics 410, the one or more feature metrics 414, and/or one or more descriptions associated with the one or more feature metrics 414 to a user of computing device 100. Additionally, content evaluation application 118 could display graphical controls in the GUI for interacting with content evaluation application 118. For example, content evaluation application 118 could receive user input specifying one or more features 408 for which to generate feature metrics. Feature evaluation module 412 generates one or more feature metrics 414 associated with the one or more specified features. As another example, content evaluation application 118 could receive user input specifying criteria for selecting the set of features used to generate the one or more feature metrics 414, such as threshold values for a success metric. Feature evaluation module 412 identifies the set of features based on the specified criteria and generates the one or more feature metrics 414 based on the identified set of features.

It will be appreciated that the system shown herein is illustrative and that variations and modifications are possible. Although FIG. 4 illustrates signal generation module 202, signal processing module 206, feature generation module 210, the one or more machine learning models 120, and feature evaluation module 412 as part of content evaluation application 118, one or more of signal generation module 202, signal processing module 206, feature generation module 210, the one or more machine learning models 120, and feature evaluation module 412 can be included in an application separate from content evaluation application 118. For example, the one or more machine learning models 120 could execute separately from content evaluation application 118. Content evaluation application 118 could transmit features 408 to a machine learning model 120 and receive a success metric 410 from the machine learning model 120. Additionally, content evaluation application 118 could include both components illustrated in FIG. 3 and in FIG. 4. For example, in some embodiments, content evaluation application 118 includes model generation module 214 as well as the one or more trained machine learning models 120 and/or feature evaluation module 412. In such cases, content evaluation application 118 is configured to both train machine learning models 120 and apply the machine learning models 120 to generate success metrics 410.

Figure 5:
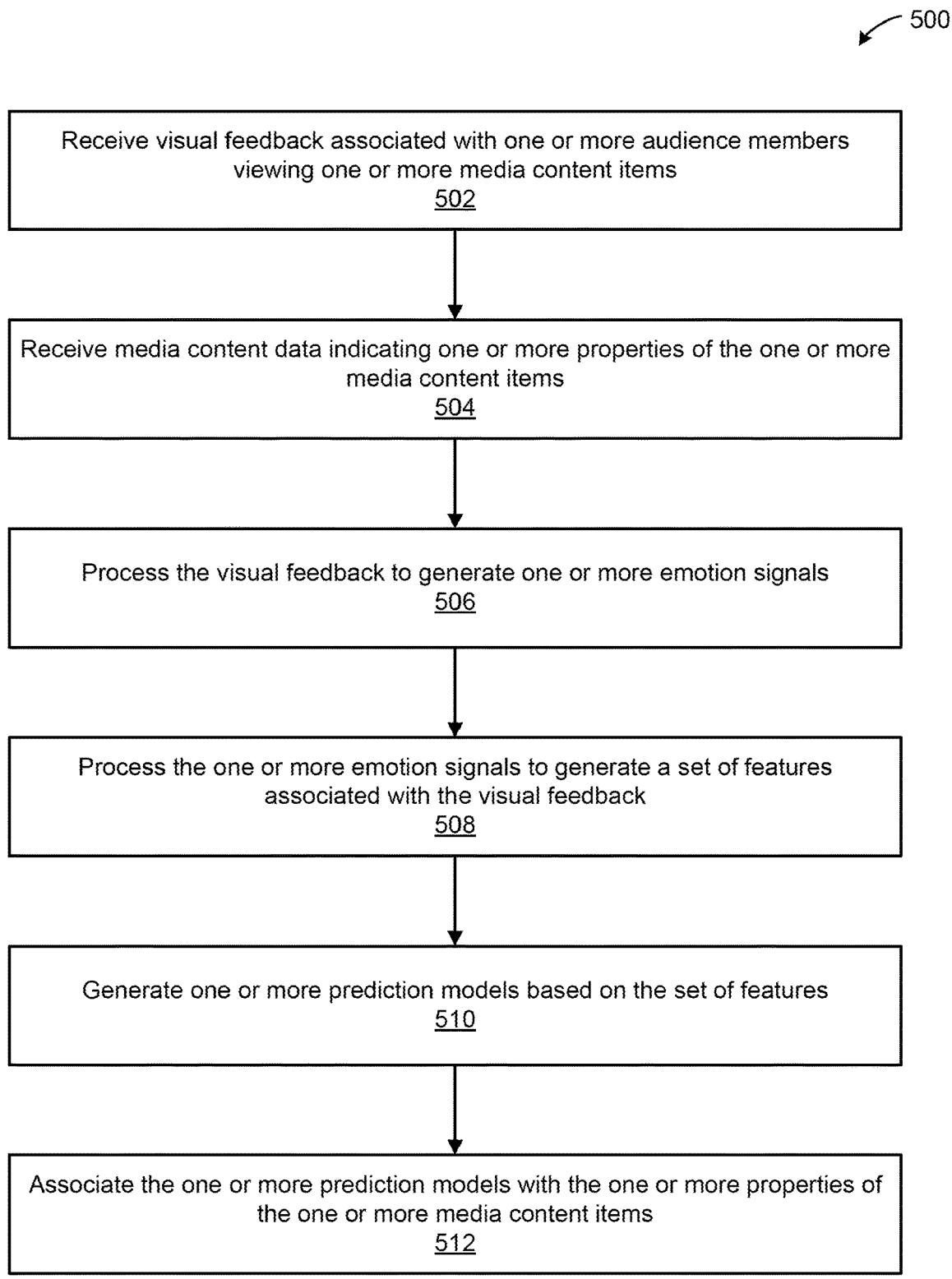
FIG. 5 is a flowchart of method steps for generating one or more machine learning models for evaluating media content, according to various embodiments.

FIG. 5 is a flowchart of method steps for generating one or more machine learning models for evaluating media content, according to various embodiments. Although the method steps are described in conjunction with the systems of FIGS. 1, and 2, persons skilled in the art will understand that any system configured to perform the method steps in any order falls within the scope of the present disclosure.

As shown in FIG. 5, a method 500 begins at step 502, where a content evaluation application 118 receives visual feedback (e.g., visual feedback 220) associated with one or more audience members viewing one or more media content items. The visual feedback includes one or more sets of images and/or one or more videos. Each set of images or video captures the facial expressions of an audience member while the audience member consumed a media content item.

In some embodiments, the one or more media content items are the same type of media content (e.g., movie, television show, etc.). Additionally or alternatively, the one or more media content items could be the same genre of media content (e.g., comedy, drama, horror, etc.). In some embodiments, if the one or more media content items include media content items of different types of media content, content evaluation application 118 divides the visual feedback into subsets, where each subset includes visual feedback for media content items of the same type of media content. Additionally or alternatively, in some embodiments, if the one or more media content items include media content items of different genres, content evaluation application 118 divides the visual feedback into subsets, where each subset includes visual feedback for media content items of the same genre of the same type of media content. Content evaluation application 118 performs the steps 504, 506, 508, 510, and 512 below for each subset of visual feedback.

At step 504, content evaluation application 118 receives media content data (e.g., media content data 230) indicating one or more properties of the one or more media content items. The media content data indicates success metrics associated with the media content item. The success metrics include one or more metrics associated with evaluating the success of the media content item. Additionally, the media content data 230 could include data indicating, for each media content item, characteristics of the media content item. The characteristics of the media content item could include for example, a type of media content of the media content item, a genre of the media content item, a length of the media content item, and the like.

At step 506, content evaluation application 118 processes the visual feedback to generate one or more emotion signals (e.g., emotion signals 204). Each emotion signal corresponds to an emotion, or emotion category, and indicates the strength of the emotion or of emotions within the emotion category while consuming a media content item. Processing visual feedback to generate one or more emotion signals is performed in a manner similar to that discussed above with respect to signal generation module 202.

In some embodiments, content evaluation application 118 generates, for one or more emotions or emotion categories, one or more emotion signals associated with each emotion or emotion category. Each emotion signal corresponds to an audience member associated with the visual feedback and indicates the strength of a given emotion, or the strength of one or more emotions within a given emotion category, expressed by the audience member at different times while viewing and/or listening to the media content item.

In some embodiments, content evaluation application 118 analyzes each image in a set of images, or each video frame in a video, and generates a value that quantifies an emotion of an audience member captured in the image or video frame. The value corresponds to a point in time of playback of the media content item associated with the image or video frame. In some embodiments, content evaluation application 118 applies a machine learning model that receives an image as input and outputs a value quantifying an emotional response based on the image. Content evaluation application 118 combines the values generated for a set of images or a video to form the emotion signal corresponding to the set of images or the video.

In some embodiments, if an image or video frame included in the visual feedback captures multiple audience members, content evaluation application 118 identifies each audience member captured in the image or video frame. For each audience member, content evaluation application 118 analyzes the portion of the image or video frame that contains the audience member and generates a value corresponding to the audience member. Analyzing the portion of the image or video frame could include cropping the image or video frame to include only the portion of the image or video frame that contains the audience member and analyzing the cropped image or video frame.

In some embodiments, content evaluation application 118 performs one or more pre-processing operations on an image or video frame prior to analyzing the image or video frame. The one or more pre-processing operations include, for example, rotating, cropping, resizing, landmark alignment, color normalization, and the like. In some embodiments, content evaluation application 118 normalizes the image or video frame to align landmarks on a face of an audience member depicted in the image or video frame. Content evaluation application 118 analyzes the processed image or video frame to generate the value associated with the image or video frame.

In some embodiments, content evaluation application 118 processes the one or more emotion signals to generate one or more processed signals (e.g., processed signals 208). Processing the one or more emotion signals includes aggregating multiple emotion signals into a single emotion signal, smoothing one or more emotion signals, smoothing an aggregated emotion signal, identifying one or more peaks included in each emotion signal, and/or identifying one or more peaks included in each aggregated emotion signal.

At step 508, content evaluation application 118 processes the one or more emotion signals to generate a set of features associated with the visual feedback (e.g., features 212). In some embodiments, content evaluation application 118 generates, for each emotion signal, one or more features corresponding to the emotion signal. Generating one or more features corresponding to an emotion signal is performed in a manner similar to that discussed above with respect to feature generation module 210.

In some embodiments, content evaluation application 118 generates, for each emotion signal, one or more count-based features corresponding to the emotion signal. Generating the one or more count-based features includes one or more of determining a total number of peaks in the emotion signal, computing the total duration of peaks, computing the average duration of peaks, identifying the longest peak, identifying the shortest peak, determining the number of peaks associated with the beginning of the media content item, determining the number of peaks associated with the end of the media content item, or determining a number of peaks within a portion of the media content item.

In some embodiments, content evaluation application 118 generates, for each emotion signal, one or more spatial features corresponding to the emotion signal. Generating the one or more spatial features includes one or more of computing an amount of time between the start of the emotion signal and the first peak, computing an amount of time between the last peak and the end of the emotion signal, computing the amount of time between each peak, computing the average amount of time between peaks, identifying the largest peak, computing the amount of time from the start of the emotion signal to the largest peak, computing the smallest amount of time between peaks, or computing the largest amount of time between peaks.

In some embodiments, content evaluation application 118 normalizes one or more features in the set of features. Normalizing a feature includes scaling the feature based on a length of the corresponding media content item compared to a target media content item length. Content evaluation application 118 determines a target media content item length associated with the corresponding media content item and a length of the media content item. In some embodiments, determining the target media content item length and/or the length of the media content item is based on media content data associated with the media content item. Content evaluation application 118 scales the feature based on the target media content item length and the length of the media content item. In some embodiments, content evaluation application 118 includes both a feature and the corresponding normalized feature in the set of features.

At step 510, content evaluation application 118 generates one or more prediction models based on the set of features. Each prediction model is trained to receive one or more features associated with a media content item and generate output indicating a predicted success metric associated with the media content item. For example, content evaluation application 118 generates one or more models 120 based on a set of features 212. Generating the one or more prediction models is performed in a manner similar to that discussed above with respect to model generation module 214.

In some embodiments, content evaluation application 118 determines, for each media content item, the actual values of one or more success metrics associated with the media content item. Content evaluation application 118 trains one or more prediction models using the set of features as training input and the actual values of the one or more success metrics for each of the media content items as training output.

In some embodiments, for each success metric, content evaluation application 118 generates a plurality of candidate prediction models based on the set of features and actual values for the success metric. Each prediction model can be a different type of model, trained using a different subset of features, and/or tuned with different hyperparameters. In some embodiments, tuning hyperparameters for one or more prediction models includes tuning parameters used generate one or more emotion signals. Steps 506 and 508 are repeated to generate different sets of emotion signals and corresponding features. Content evaluation application 118 selects one or more prediction models to store and/or use from the plurality of candidate prediction models. The selected prediction models include prediction models with the highest accuracy and/or the lowest error rate. In some embodiments, content evaluation application 118 uses a grid search algorithm to generate the plurality of candidate prediction models and select one or more prediction models from the plurality of candidate prediction models.

At step 512, content evaluation application 118 associates the one or more prediction models with the one or more properties of the one or more media content items. Content evaluation application 118 determines the one or more properties based on the media content data. In some embodiments, the one or more properties include a type of media content of the one or more media content items. In some embodiments, the one or more properties include a genre of the one or more media content items.

In some embodiments, after generating the one or more prediction models, content evaluation application 118 stores the one or more prediction models. For example, content evaluation application 118 stores one or more machine learning models 120 in storage 114. Additionally, content evaluation application 118 stores data associated with the one or more machine learning models 120, such as the media content data, the set of features used to generate the one or more machine learning models 120, the parameters used to generate processed emotion signals from which the set of features were derived, and/or the like.

Figure 6:
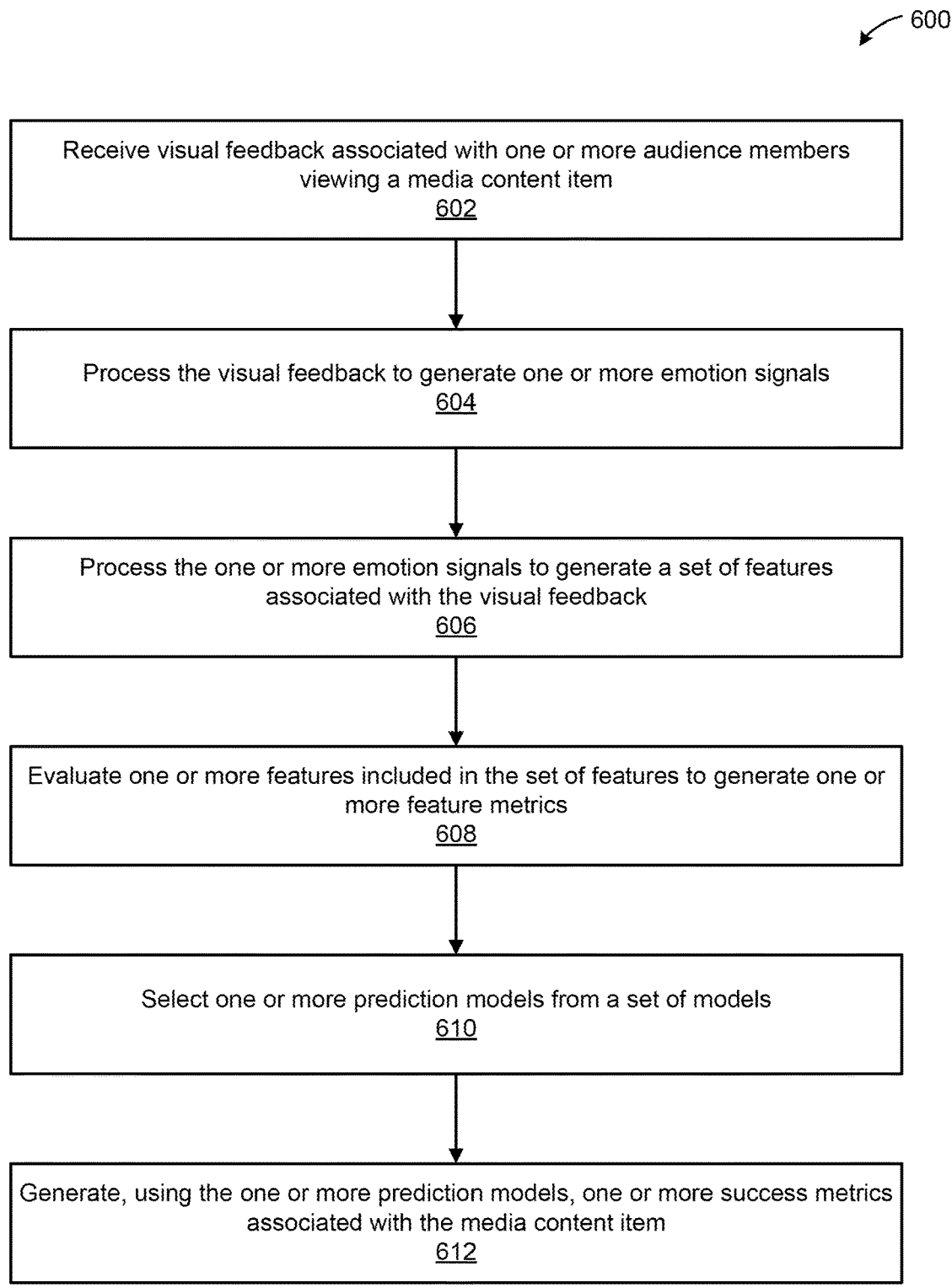
FIG. 6 is a flowchart of method steps for evaluating media content using one or more trained machine learning models, according to various embodiments.

FIG. 6 is a flowchart of method steps for evaluating media content using one or more trained machine learning models, according to various embodiments. Although the method steps are described in conjunction with the systems of FIGS. 1 and 4, persons skilled in the art will understand that any system configured to perform the method steps in any order falls within the scope of the present disclosure.

As shown in FIG. 6, a method 600 begins at step 602 where a content evaluation application 118 receives visual feedback (e.g., visual feedback 402) associated with one or more audience members viewing a media content item. The visual feedback includes one or more sets of images and/or one or more videos. Each set of images or video captures the facial expressions of an audience member while the audience member consumed the media content item. Additionally, in some embodiments, content evaluation application 118 receives media content data (e.g., media content data 420) associated with the media content item.

At step 604, the content evaluation application 118 processes the visual feedback to generate one or more emotion signals (e.g., emotion signals 404). Each emotion signal corresponds to an emotion, or emotion category, and indicates the strength of the emotion or of emotions within the emotion category while consuming the media content item. Processing visual feedback to generate one or more emotion signals is performed in a manner similar to that discussed above with respect to signal generation module 202.

In some embodiments, content evaluation application 118 generates, for one or more emotions or emotion categories, one or more emotion signals associated with each emotion or emotion category. Each emotion signal corresponds to an audience member associated with the visual feedback and indicates the strength of a given emotion, or the strength of one or more emotions within a given emotion category, expressed by the audience member at different times while viewing and/or listening to the media content item.

In some embodiments, content evaluation application 118 analyzes each image in a set of images, or each video frame in a video, and generates a value that quantifies an emotion of an audience member captured in the image or video frame. The value corresponds to a point in time of playback of the media content item associated with the image or video frame. In some embodiments, content evaluation application 118 applies a machine learning model that receives an image as input and outputs a value quantifying an emotional response based on the image. Content evaluation application 118 combines the values generated for a set of images or a video to form the emotion signal corresponding to the set of images or the video.

In some embodiments, if an image or video frame included in the visual feedback captures multiple audience members, content evaluation application 118 identifies each audience member captured in the image or video frame. For each audience member, content evaluation application 118 analyzes the portion of the image or video frame that contains the audience member and generates a value corresponding to the audience member. Analyzing the portion of the image or video frame could include cropping the image or video frame to include only the portion of the image or video frame that contains the audience member and analyzing the cropped image or video frame.

In some embodiments, content evaluation application 118 performs one or more pre-processing operations on an image or video frame prior to analyzing the image or video frame. The one or more pre-processing operations include, for example, rotating, cropping, resizing, landmark alignment, color normalization, and the like. In some embodiments, content evaluation application 118 normalizes the image or video frame to align landmarks on a face of an audience member depicted in the image or video frame. Content evaluation application 118 analyzes the processed image or video frame to generate the value associated with the image or video frame.

In some embodiments, content evaluation application 118 processes the one or more emotion signals to generate one or more processed signals. Processing the one or more emotion signals includes aggregating multiple emotion signals into a single emotion signal, smoothing one or more emotion signals, smoothing an aggregated emotion signal, identifying one or more peaks included in each emotion signal, and/or identifying one or more peaks included in each aggregated emotion signal.

At step 606, the content evaluation application 118 processes the one or more emotion signals to generate a set of features associated with the visual feedback (e.g., features 408). In some embodiments, content evaluation application 118 generates, for each emotion signal, one or more features corresponding to the emotion signal. Generating one or more features corresponding to an emotion signal is performed in a manner similar to that discussed above with respect to feature generation module 210.

In some embodiments, content evaluation application 118 generates, for each emotion signal, one or more count-based features corresponding to the emotion signal. Generating the one or more count-based features includes one or more of determining a total number of peaks in the emotion signal, computing the total duration of peaks, computing the average duration of peaks, identifying the longest peak, identifying the shortest peak, determining the number of peaks associated with the beginning of the media content item, determining the number of peaks associated with the end of the media content item, or determining a number of peaks within a portion of the media content item.

In some embodiments, content evaluation application 118 generates, for each emotion signal, one or more spatial features corresponding to the emotion signal. Generating the one or more spatial features includes one or more of computing an amount of time between the start of the emotion signal and the first peak, computing an amount of time between the last peak and the end of the emotion signal, computing the amount of time between each peak, computing the average amount of time between peaks, identifying the largest peak, computing the amount of time from the start of the emotion signal to the largest peak, computing the smallest amount of time between peaks, or computing the largest amount of time between peaks.

In some embodiments, content evaluation application 118 normalizes one or more features in the set of features. Normalizing a feature includes scaling the feature based on a length of the media content item compared to a target media content item length. Content evaluation application 118 determines a target media content item length associated with the media content item and a length of the media content item. In some embodiments, determining the target media content item length and/or the length of the media content item is based on media content data associated with the media content item. Content evaluation application 118 scales the feature based on the target media content item length and the length of the media content item. In some embodiments, content evaluation application 118 includes both a feature and the corresponding normalized feature in the set of features.

At step 608, the content evaluation application 118 evaluates one or more features included in the set of features to generate one or more feature metrics (e.g., feature metrics 414). Each feature metric is a metric associated with a feature included in the set of features and indicates how the feature compares to other features of the same type that were generated based on visual feedback associated with other media content items. Generating the one or more feature metrics is performed in a manner similar to that discussed above with respect to feature evaluation module 412.

Content evaluation application 118 retrieves a plurality of features generated based on visual feedback associated with other media content items. In some embodiments, content evaluation application 118 retrieves features generated based on visual feedback associated with other media content items of the same type of media content and/or the same genre of media content. Additionally, content evaluation application 118 retrieves features generated based on visual feedback associated with other media content items that are associated with one or more positive success metrics. Content evaluation application 118 performs one or more comparison operations between features included in the set of features and the retrieved features to generate the one or more feature metrics. Additionally, content evaluation application 118 could perform one or more analysis operations on the retrieved features, such as computing average values for a feature, computing maximum or minimum values for a feature, identifying the most frequent value(s) for a feature, and the like. The one or more comparison operations include, for example, determining whether a feature value is equivalent to, greater than, or less than one or more of a retrieved feature value, an average value, a maximum value, a minimum value, the most frequent value, and such. Additionally, if the feature value is a numeric value, content evaluation application 118 could compute a difference between the feature value and the value to which the feature value is being compared.

In some embodiments, content evaluation application 118 receives user input specifying one or more feature metrics to generate. In response, content evaluation application 118 generates the one or more specified feature metrics. In some embodiments, content evaluation application 118 receives user input specifying one or more parameters for generating feature metrics, such as parameters for determining whether a success metric is a positive success metric. Content evaluation application 118 retrieves features and/or generates feature metrics based on the specified parameters.

At step 610, the content evaluation application 118 selects one or more prediction models from a set of models. Selecting one or more prediction models is performed in a manner similar to that discussed above with respect to content evaluation application 118, machine learning models 120, and success metric(s) 410. In some embodiments, content evaluation application 118 selects the one or more prediction models from a plurality of prediction models based on characteristics of the media content item, such as a type of media content of the media content item and/or a genre of the media content item. In some embodiments, content evaluation application 118 determines the characteristics of the media content item based on media content data associated with the media content item (e.g., media content data 420). In some embodiments, content evaluation application 118 selects the one or more prediction models based on one or more desired success metrics. The one or more desired success metrics could be, for example, specified by a user. Content evaluation application 118 selects one or more prediction models that are trained to output the desired success metrics.

At step 612, the content evaluation application 118 generates one or more success metrics (e.g., success metrics 410) associated with the media content using the one or more prediction models. Content evaluation application 118 provides the set of features to each prediction model and receives, from the prediction model, output corresponding to a given success metric. In some embodiments, if content evaluation application 118 determines that a prediction model uses only a subset of features, for example, if the prediction model was trained with fewer features than included in the set of features. Content evaluation application 118 identifies the subset of features to provide to the prediction model and provides the subset of features to the prediction model as input.

In some embodiments, after generating the one or more success metrics and one or more feature metrics, content evaluation application 118 outputs the one or more success metrics and the one or more feature metrics to a user. In some embodiments, outputting the one or more success metrics and one or more feature metrics includes generating a graphical user interface that depicts the one or more success metrics and one or more feature metrics. In some embodiments, outputting the one or more success metrics and one or more feature metrics includes storing the one or more success metrics and one or more feature metrics in a storage device. The stored success metric(s) feature metric(s) can be provided to other users for evaluation or to other applications for further processing and analysis. Additionally, in some embodiments, content evaluation application 118 stores the set of features generated in step 606. Content evaluation application 118 uses the stored set of features when generating feature metrics for other media content items.

In sum, techniques are disclosed for generating and utilizing machine learning models to evaluate media content. A content evaluation application receives visual feedback that captures the reactions of one or more audience members while each audience member is viewing media content. The content evaluation application analyzes the visual feedback to generate one or more emotion signals, where each emotion signal indicates the strength of an emotion over time while an audience member viewed the media content. The content evaluation application generates a plurality of features for use with machine learning models based on the one or more emotion signals. The plurality of features for media content with known success metrics is used to train machine learning models that can output predicted success metrics based on a set of input features. The plurality of features for media content being evaluated is provided as input to one or more trained machine learning models to generate predicted success metrics for the media content being evaluated.

At least one technical advantage of the disclosed techniques relative to the prior art is that, using the disclosed techniques, more accurate predictions of the audience appeal of media content are generated. In particular, by using a machine learning model to evaluate audience reactions to the media content, more reliable audience response measurements are produced compared to approaches that evaluate the media content itself. Accordingly, the predictions generated using the model-generated audience responses are more accurate compared to predictions generated using machine learning models that evaluate media content. These technical advantages represent one or more technological improvements over prior art approaches.

1. In some embodiments, a computer-implemented method for evaluating media content items comprises receiving visual feedback associated with one or more audience members viewing a media content item; analyzing the visual feedback to generate one or more emotion signals based on the visual feedback; and generating a set of features associated with the one or more audience members viewing the media content item based on the one or more emotion signals.

2. The computer-implemented method of clause 1, further comprising training one or more machine learning models based on the set of features.

3. The computer-implemented method of clause 1 or 2, wherein training the one or more machine learning models comprises generating a plurality of candidate machine learning models based on the set of features and selecting the one or more machine learning models from the plurality of candidate machine learning models.

4. The computer-implemented method of any of clauses 1-3, further comprising generating, via a trained machine learning model, a success metric associated with the media content item based on the set of features.

5. The computer-implemented method of any of clauses 1-4, wherein generating the success metric via the trained machine learning model comprises determining one or more characteristics of the media content item and selecting the trained machine learning model from a plurality of trained machine learning models based on the one or more characteristics.

6. The computer-implemented method of any of clauses 1-5, wherein analyzing the visual feedback comprises for each audience member included in the one or more audience members, determining a strength of an emotion over a period of time associated with the audience member viewing the media content item.

7. The computer-implemented method of any of clauses 1-6, wherein generating the set of features comprises processing the one or more emotion signals to generate one or more processed emotion signals.

8. The computer-implemented method of any of clauses 1-7, wherein processing the one or more emotion signals comprises aggregating the one or more emotion signals.

9. The computer-implemented method of any of clauses 1-8, wherein processing the one or more emotion signals comprises smoothing each emotion signal included in the one or more emotion signals.

10. The computer-implemented method of any of clauses 1-9, wherein processing the one or more emotion signals comprises identifying one or more peaks included in each emotion signal included in the one or more emotion signals.

11. In some embodiments, one or more non-transitory computer-readable medium include instructions that, when executed by one or more processors, cause the one or more processors to perform the steps of receiving visual feedback associated with one or more audience members viewing a media content item; analyzing the visual feedback to generate one or more emotion signals based on the visual feedback; and generating a set of features associated with the one or more audience members viewing the media content item based on the one or more emotion signals.

12. The one or more non-transitory computer-readable medium of clause 11, wherein the instructions, when executed by the one or more processors, further cause the one or more processors to perform the step of training one or more machine learning models based on the set of features.

13. The one or more non-transitory computer-readable medium of clause 11 or 12, wherein training the one or more machine learning models comprises generating a plurality of candidate machine learning models based on the set of features and selecting the one or more machine learning models from the plurality of candidate machine learning models.

14. The one or more non-transitory computer-readable medium of any of clauses 11-13, wherein the instructions, when executed by the one or more processors, further cause the one or more processors to perform the step of generating, via a trained machine learning model, a success metric associated with the media content item based on the set of features.

15. The one or more non-transitory computer-readable medium of any of clauses 11-14, wherein generating the success metric via the trained machine learning model comprises determining one or more characteristics of the media content item and selecting the trained machine learning model from a plurality of trained machine learning models based on the one or more characteristics.

16. The one or more non-transitory computer-readable medium of any of clauses 11-15, wherein analyzing the visual feedback comprises for each audience member included in the one or more audience members, determining a strength of an emotion over a period of time associated with the audience member viewing the media content item.

17. The one or more non-transitory computer-readable medium of any of clauses 11-16, wherein generating the set of features is based on one or more peaks included in each emotion signal included in the one or more emotion signals.

18. The one or more non-transitory computer-readable medium of any of clauses 11-17, wherein generating the set of features is based on a number of peaks included in each emotion signal included in the one or more emotion signals.

19. The one or more non-transitory computer-readable medium of any of clauses 11-18, wherein generating the set of features is based on a location of each peak included in each emotion signal included in the one or more emotion signals.

20. In some embodiments, a system comprises one or more memories storing instructions; one or more processors that are coupled to the one or more memories and, when executing the instructions, are configured to receive visual feedback associated with one or more audience members viewing a media content item; analyze the visual feedback to generate one or more emotion signals based on the visual feedback; and generate a set of features associated with the one or more audience members viewing the media content item based on the one or more emotion signals.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits.

Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for evaluating media content items, the method comprising:
    receiving visual feedback associated with one or more audience members viewing or listening to a media content item;
    analyzing the visual feedback to generate one or more emotion signals based on the visual feedback, wherein each of the one or more emotion signals quantifies a strength of a specific emotion expressed by a corresponding audience member while viewing or listening to the media content item;
    generating a set of features associated with the one or more audience members based on the one or more emotion signals; and
    generating, via a trained machine learning model, a success metric associated with the media content item based on the set of features, wherein the success metric indicates a predicted success of the media content item with one or more other audience members.

2. The computer-implemented method of claim 1, further comprising training one or more machine learning models based on one or more additional sets of features and one or more additional success metrics to generate the trained machine learning model.

3. The computer-implemented method of claim 2, wherein training the one or more machine learning models comprises generating a plurality of candidate machine learning models based on the one or more additional sets of features and the one or more additional success metrics and selecting the trained machine learning model from the plurality of candidate machine learning models.

4. The computer-implemented method of claim 1, wherein generating the success metric via the trained machine learning model comprises determining one or more characteristics of the media content item and selecting the trained machine learning model from a plurality of trained machine learning models based on the one or more characteristics.

5. The computer-implemented method of claim 1, wherein analyzing the visual feedback comprises for each audience member included in the one or more audience members, determining a strength of the specific emotion over a period of time associated with the audience member viewing or listening to the media content item.

6. The computer-implemented method of claim 1, wherein generating the set of features comprises processing the one or more emotion signals to generate one or more processed emotion signals.

7. The computer-implemented method of claim 6, wherein processing the one or more emotion signals comprises aggregating the one or more emotion signals into a processed emotion signal that is included in the one or more processed emotion signals and represents an overall emotional response of the one or more audience members to the media content item over time.

8. The computer-implemented method of claim 6, wherein processing the one or more emotion signals comprises smoothing each emotion signal included in the one or more emotion signals.

9. The computer-implemented method of claim 6, wherein processing the one or more emotion signals comprises identifying one or more peaks included in each emotion signal included in the one or more emotion signals.

10. The computer-implemented method of claim 1, wherein the media content item comprises at least one of a video or audiovisual content.

11. The computer-implemented method of claim 1, wherein the success metric comprises at least one of a likelihood of viewing or listening to the media content item by the one or more other audience members, a likelihood of selecting the media content item for inclusion in a media library, a rating, a viewer count, an audience retention rate, a streaming platform performance, or a box office performance.

12. One or more non-transitory computer-readable medium including instructions that, when executed by one or more processors, cause the one or more processors to perform the steps of:
receiving visual feedback associated with one or more audience members viewing or listening to a media content item;
analyzing the visual feedback to generate one or more emotion signals based on the visual feedback, wherein each of the one or more emotion signals quantifies a strength of a specific emotion expressed by a corresponding audience member while viewing or listening to the media content item;
generating a set of features associated with the one or more audience members based on the one or more emotion signals; and
generating, via a trained machine learning model, a success metric associated with the media content item based on the set of features, wherein the success metric indicates a predicted success of the media content item with one or more other audience members.

13. The one or more non-transitory computer-readable medium of claim 12, wherein the instructions, when executed by the one or more processors, further cause the one or more processors to perform the step of training one or more machine learning models based on one or more additional sets of features and one or more additional success metrics to generate the trained machine learning model.

14. The one or more non-transitory computer-readable medium of claim 13, wherein training the one or more machine learning models comprises generating a plurality of candidate machine learning models based on the one or more additional sets of features and the one or more additional success metrics and selecting the trained machine learning model from the plurality of candidate machine learning models.

15. The one or more non-transitory computer-readable medium of claim 12, wherein generating the success metric via the trained machine learning model comprises determining one or more characteristics of the media content item and selecting the trained machine learning model from a plurality of trained machine learning models based on the one or more characteristics.

16. The one or more non-transitory computer-readable medium of claim 12, wherein analyzing the visual feedback comprises for each audience member included in the one or more audience members, determining a strength of an emotion category that includes the specific emotion over a period of time associated with the audience member viewing or listening to the media content item.

17. The one or more non-transitory computer-readable medium of claim 12, wherein generating the set of features is based on one or more peaks included in each emotion signal included in the one or more emotion signals.

18. The one or more non-transitory computer-readable medium of claim 12, wherein generating the set of features is based on a number of peaks included in each emotion signal included in the one or more emotion signals.

19. The one or more non-transitory computer-readable medium of claim 12, wherein generating the set of features is based on a location of each peak included in each emotion signal included in the one or more emotion signals.

20. A system comprising:
one or more memories storing instructions; and
one or more processors that are coupled to the one or more memories and, when executing the instructions, are configured to:
receive visual feedback associated with one or more audience members viewing or listening to a media content item,
analyze the visual feedback to generate one or more emotion signals based on the visual feedback, wherein each of the one or more emotion signals quantifies a strength of a specific emotion expressed by a corresponding audience member while viewing or listening to the media content item,
generate a set of features associated with the one or more audience members based on the one or more emotion signals, and
generate, via a trained machine learning model, a success metric associated with the media content item based on the set of features, wherein the success metric indicates a predicted success of the media content item with one or more other audience members.

* * * * *